United States Patent [19]

Dick

[11] Patent Number: 4,679,125
[45] Date of Patent: Jul. 7, 1987

[54] HEADLAMP-INDICATOR UNIT FOR MOTOR VEHICLES

[75] Inventor: Heinz Dick, Odenthal, Fed. Rep. of Germany

[73] Assignee: Ford Motor Company, Dearborn, Mich.

[21] Appl. No.: 761,226

[22] Filed: Jul. 31, 1985

[30] Foreign Application Priority Data

Aug. 2, 1984 [DE] Fed. Rep. of Germany ....... 3428467

[51] Int. Cl.⁴ .............................................. F21V 3/18
[52] U.S. Cl. ...................................... 362/66; 362/80; 362/240; 362/275
[58] Field of Search ..................... 362/66, 80, 83, 238, 362/240, 241, 273, 275, 285, 287, 289, 307, 311, 347, 350, 368, 372, 61

[56] References Cited

U.S. PATENT DOCUMENTS 4,539,626 9/1985 Hawlitzki et al. .................... 362/66

FOREIGN PATENT DOCUMENTS 2725953 7/1979 Fed. Rep. of Germany .
2743745 8/1979 Fed. Rep. of Germany .

Primary Examiner—James C. Yeung
Assistant Examiner—Noah Kamen
Attorney, Agent, or Firm—Daniel M. Stock; Clifford L. Sadler

[57] ABSTRACT

A headlamp-indicator unit (1) for motor vehicles, includes a reflector unit (2) made of plastic material or a spacer member of plastic material with a reflector of metal, in which are formed closed lamp chambers (3, 4) with corresponding reflector walls and openings for lamp sockets for a main headlamp and a flashing direction indicator, which are covered by corresponding diffusion and light lenses (5, 6), the entire headlamp-indicator unit being pivotable both about a horizontal and about a vertical pivot axis. The headlamp-indicator unit (1) is supported in a support plane (E) parallel to the longitudinal median plane of the vehicle by a rounded supporting edge (10) on the fender (8) and a corresponding supporting groove (11) on the reflector unit (2), which both lie on the arc (r) with respect to the intersection (S) of the horizontal pivot axis (H) with the support plane (E). The light lens (6) of the flashing direction indicator (4) is extended around the corner of the bodywork, viewed from the side, the rear edge (12) of the unit and has a concentric arcuate profile (R) which matches a corresponding receiving recess (13) in the fender (8) having a radius (R').

4 Claims, 4 Drawing Figures

HEADLAMP-INDICATOR UNIT FOR MOTOR VEHICLES

BACKGROUND OF THE INVENTION

The invention relates to a headlamp-indicator unit for motor vehicles.

German Pat. No. 27 25 953 discloses a headlamp-indicator unit, which includes closed lamp chambers with corresponding reflector walls and openings for lamp sockets formed in a reflector unit made of plastic material or of a spacer member of plastic material and having a reflector of metal. One lamp chamber is designed for accommodating a main headlamp and the other lamp chamber disposed laterally thereto is designed for a flashing direction indicator. The two lamp chambers are covered by corresponding diffusion and light lenses, respectively; and the entire headlamp-indicator unit is secured in the vehicle bodywork so as to be pivotable about both a horizontal and vertical setting axis in order to permit the necessary light-range setting and side setting of the main headlamp light beam.

German Pat. No. 27 43 745 (U.S. Pat. No. 4,196,459) discloses a suitable fastening arrangement for a headlamp-indicator unit.

The known headlamp-indicator units have the disadvantage that the flashing direction indicator disposed at the side of the main headlamp can only be provided with a light lens emitting light towards the front, and the portion of the light lens extended around the corner of the bodywork can get out of alignment and deviate with respect to its receiving recess in the fender of the motor vehicle bodywork when adjustments of the headlamp-indicator unit are made about the horizontal and vertical pivot axes. This may be unacceptable from the standpoint of styling and aerodynamics.

SUMMARY OF THE INVENTION

According to the invention, there is provided a headlamp-indicator unit for motor vehicles including a reflector unit having closed lamp chambers with corresponding reflector walls and openings for lamp sockets for a main headlamp and a flashing direction indicator. The chambers are covered by corresponding diffusion and light lenses respectively, and the headlamp-indicator unit is adjustable both about a horizontal and about a vertical pivot axis. The invention headlamp-indicator unit differs from the previously discussed devices of the prior art in that the headlamp-indicator unit can be supported in a support plane generally parallel to the longitudinal median plane of the vehicle by a rounded supporting edge on a fender and a corresponding supporting groove on the reflector unit, which both lie on an arc with respect to the intersection of the horizontal pivot axis with the support plane. The light lens of the flashing direction indicator can be extended around the corner of the bodywork and, as viewed from the side, its rear edge has a concentric arcuate profile which matches a corresponding receiving recess in the fender.

The headlamp-indicator unit can be supported on the fender in such a way that the horizontal pivot axis can be positioned extremely forward or in the center of gravity of the headlamp-indicator unit, so that the use of top-heavy supports for the headlamp-indicator unit which are troublesome in the event of vibration are avoided.

The headlamp-indicator unit may be provided on its lower edge with supporting ribs which have concentric arcuate profiles with respect to the horizontal pivot axis and which ensure its correct position relative to the adjacent bumper.

The headlamp-indicator unit is conveniently held resting on its support on the fender by a conventional tension spring device which engages at one end upon a suspension slot located at the point of intersection of the horizontal pivot axis in a lug projecting to the rear on the reflector unit and at the other end upon part of the bodywork. The suspension slot necessary for securing the tension spring device can be provided without a slide arrangement in the die-casting mold of the reflector unit.

In a preferred embodiment, the horizontal pivot axis of the headlamp-indicator unit is located in known manner halfway up to the unit and the lateral profile of the light lens of the flashing direction indicator can correspond approximately to a semi-circle.

In another preferred embodiment, the horizontal pivot axis of the headlamp-indicator unit is located on the forward lower edge of the unit and the lateral profile of the light lens of the flashing direction indicator can correspond to a quadrant.

In this way, despite the restriction to the circular profile in the interface between indicator lens and fender, a certain degree of variation in styling is made possible.

BRIEF DESCRIPTION OF THE DRAWINGS

The invention will now be described further, by way of example, with reference to the accompanying drawings, in which.

DESCRIPTION OF THE PREFERRED EMBODIMENT

Figure 1:
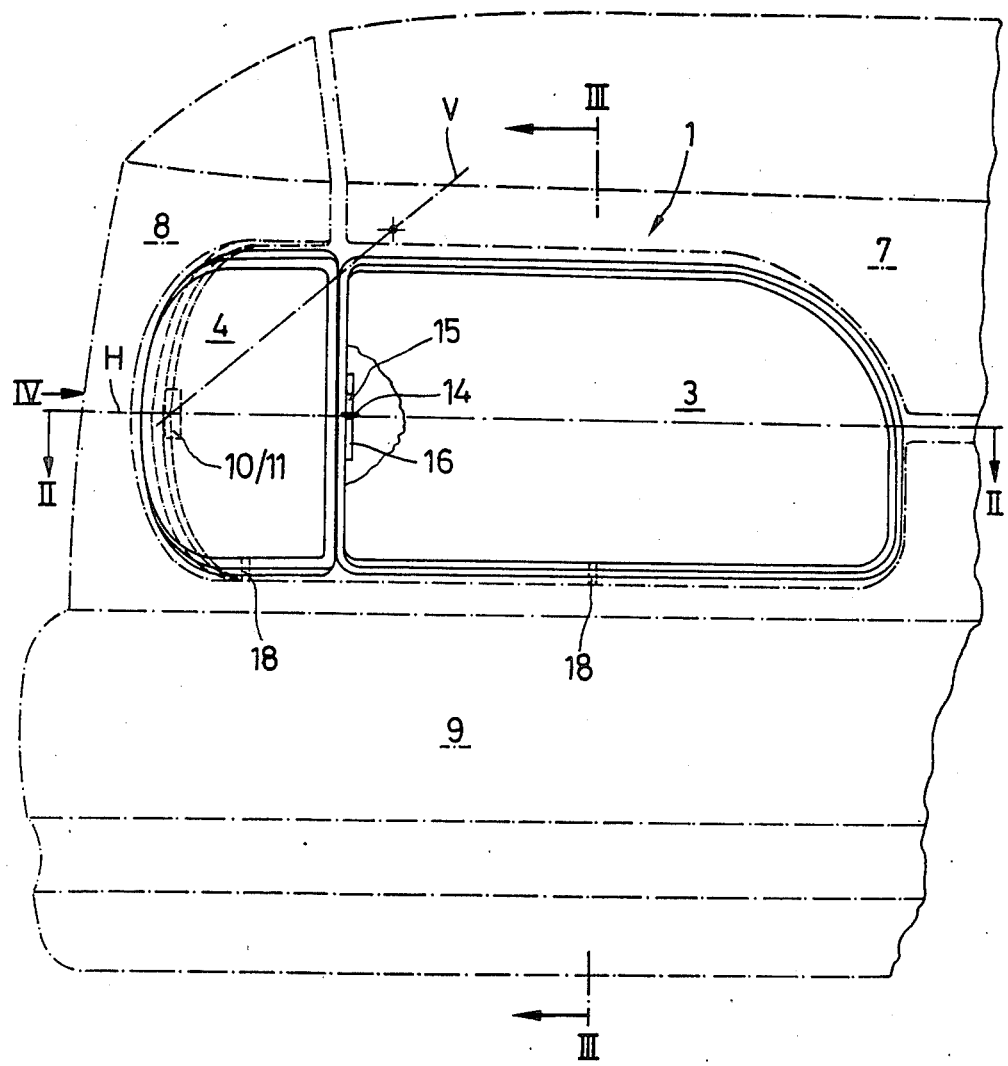
FIG. 1 is a front view of a headlamp-indicator unit embodying the invention.

A headlamp-indicator unit 1 comprises a reflector unit 2 of plastic material (alternatively a spacer member of plastic material with a reflector of metal may be used), in which are formed closed lamp chambers 3 and 4 having appropriate reflector walls and openings for lamp sockets for a main headlamp and a flashing direction indicator. The lamp chamber for the main headlamp 3 and the lamp chamber for the flashing direction indicator 4 are covered by a diffusion lens 5 and a light lens 6, respectively.

The diffusion lens 5 and the light lens 6 are arranged in close proximity to corresponding openings or recesses in the adjacent parts of the bodywork of the vehicle such as the hood 7 and the fender 8. The surface profile of the diffusion lens 5 and the light lens 6 pass as smoothly as possible into the surface of the adjacent parts of the bodywork. The lower termination of the headlamp-indicator unit is preferably formed by a bumper 9 consisting of plastic material.

The headlamp-indicator unit 1 is secured in known manner to the bodywork so as to be adjustable both about a horizontal pivot axis H and about an approximately vertical pivot axis V. It will be appreciated that the slanted axis V is referred to here as an approximately vertical axis to denote the fact that the vertical slope of the axis permits lateral adjustment of the headlamp-indicator unit 1 in horizontal planes of the vehicle body. A vertical adjustment device VA in the form of a conventional adjusting screw and nut arrangement is provided for the corresponding adjustment of the light range by pivoting the headlamp-indicator unit 1 about the horizontal pivot axis H. A horizontal adjustment device HA in the form of an adjusting screw and nut arrangement is provided for the lateral adjustment of the headlamp-indicator unit about the approximately vertical pivot axis V. Instead of the known adjusting screw and nut arrangement for vertical adjustment, an appropriate mechanical, electrical or hydraulic adjustment device may of course alternatively be provided, by means of which changes in the light range caused by differing loads upon the motor vehicle can be corrected automatically.

The headlamp-indicator unit 1 is held in a support on the fender 8 so as to be pivotably movable in a manner similar to the arrangement in the case of the known units described above. This support is provided in a support plane E parallel to the longitudinal median plane of the vehicle by a rounded supporting edge 10 on the fender 8 and a corresponding support groove 11 on the reflector unit 2. Both edge 10 and groove 11 lie on an arc r with respect to the intersection S of the horizontal pivot axis H with the support plane E. The light lens 6 of the flashing direction indicator 4 is extended around the corner of the bodywork and, as viewed from the side as in FIG. 4, its rear edge 12 has an arcuate profile R which matches a receiving recess 13 in the fender 8 with a radius R' at a slight distance therefrom.

When the headlamp-indicator unit 1 is adjusted about the horizontal pivot axis H, the rear edge 12 of the flashing direction indicator 4 cannot get out of alignment with its receiving recess 13.

Figure 2:
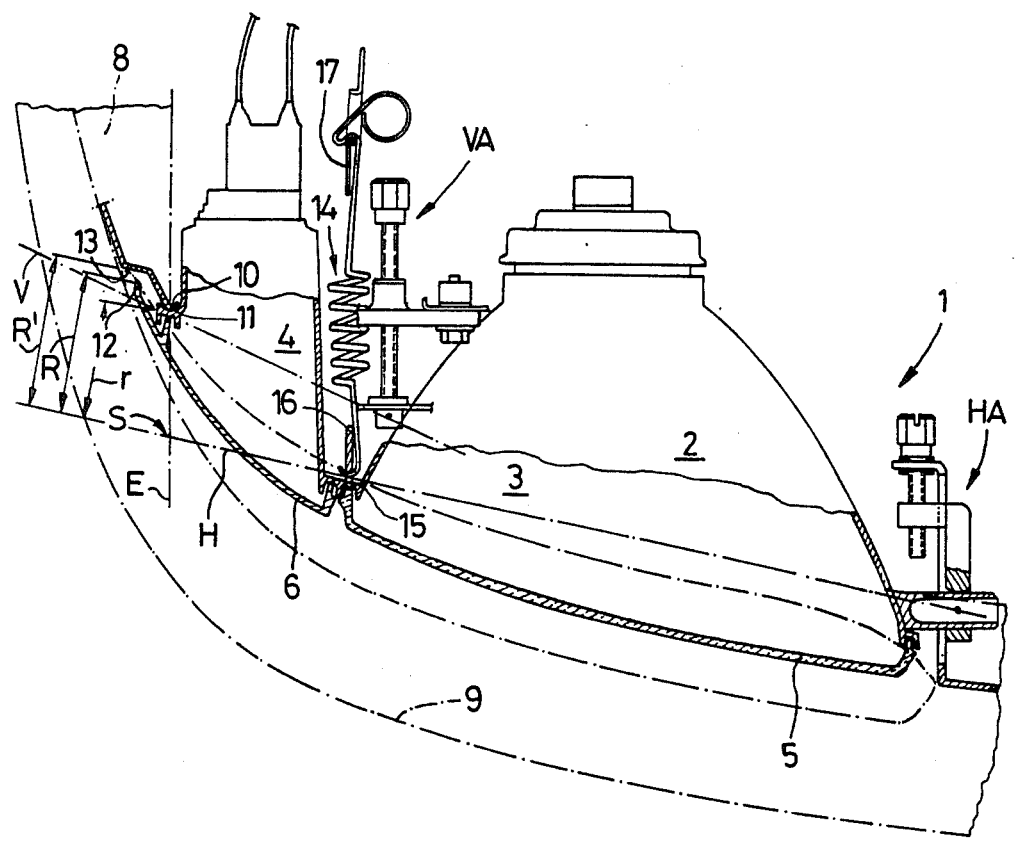
FIG. 2 is a horizontal section along the line II—II of the headlamp-indicator unit in FIG. 1.
Figure 3:
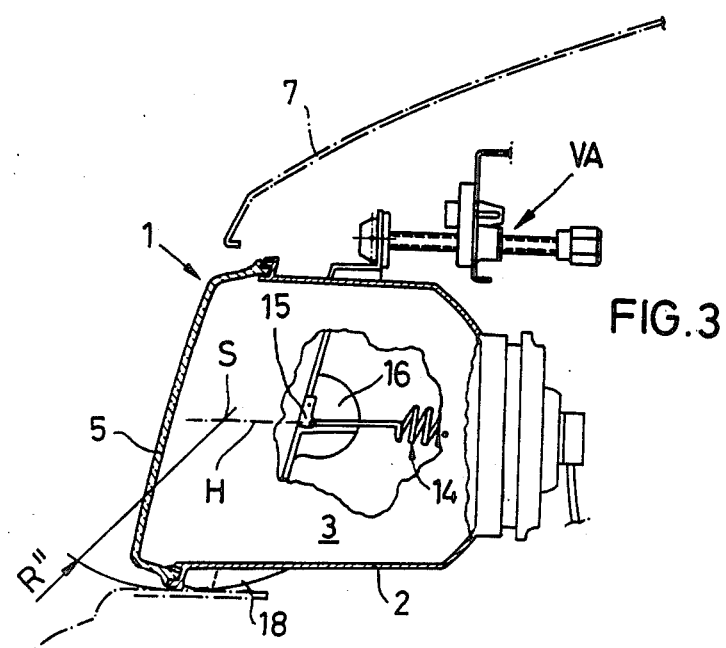
FIG. 3 is a vertical section along the line III—III in FIG. 1.

When the headlamp-indicator unit 1 is adjusted about the vertical pivot axis V. Slight deviations may arise in the alignment of the surface of the light lens 6 of the flashing direction indicator 4 with the adjacent surface of the fender 8. These errors in alignment may remain largely imperceptible, however, due to the fact that the rear edge 12 of the light lens 6 is angled towards is receiving recess 13, as may best be seen in FIG. 2.

The headlamp-indicator unit 1 is secured to its support on the fender 8 by a tension spring device 14 which engages at one end upon the reflector unit 2 and at the other end upon a part 17 of the bodywork, for example part of a web plate. The suspension slot 15 for suspending the tension spring device 14 on the reflector unit 2 is formed on the front edge of a lug 16 projecting towards the rear between the lamp chamber for the main headlamp 3 and the lamp chamber for the flashing direction indicator 4, so that no slide is required in the die-casting mold for the reflector unit 2 in order to produce the suspension slot 15. The shape of the suspension slot 15 allows the hook of the tension spring device 14 to be suspended in an approximately vertical position during assembly and maintains the position of the spring hook after pivoting about 90° to its operating position in which its line of action intersects the horizontal pivot axis H of the headlamp-indicator unit 1.

The headlamp-indicator unit 1 can be provided on its lower forward edge with supporting ribs 18 which have concentric arcuate profiles R'' with respect to the horizontal pivot axis H and which ensure its correct position relative to the adjacent bumper 9.

Figure 4:
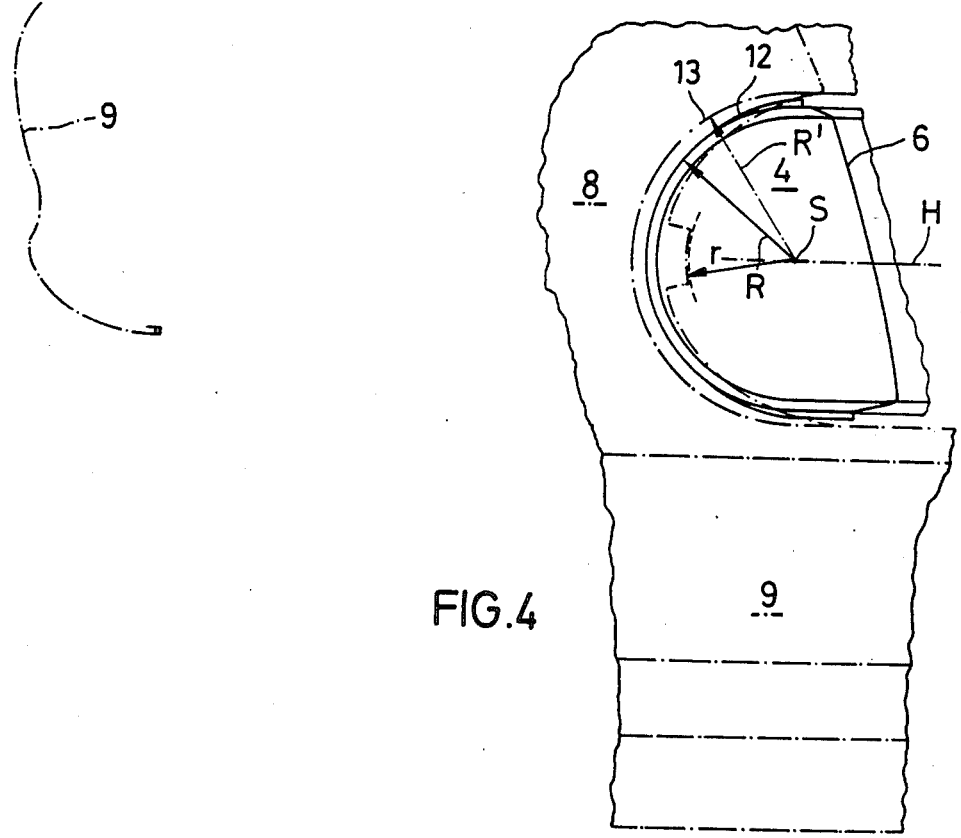
FIG. 4 is an elevation in the direction of arrow IV in FIG. 1.

In the embodiment of a headlamp-indicator unit 1 for motor vehicles, as illustrated in the drawings, the horizontal pivot axis H is located halfway up the unit and, consequently, the lateral profile of the lens, as viewed on the left side of FIG. 4 of the flashing direction indicator, must correspond to a semi-circle.

It is also possible, however, to position the horizontal pivot axis H of the headlamp-indicator unit at the level of the forward lower edge of the unit, as a result of which the lateral profile of the light lens of the flashing direction indicator correspond approximately to a quadrant. In this connection, however, difficulties may arise on account of the projection of the upper edge of the headlamp-indicator unit 1—differing in extent during pivoting about the horizontal pivot axis H—with respect to its adjacent bodywork components, the hood 7 and the fender 8, but they can be reduced by correspondingly large radii on the upper edge of the diffusion lens 5 and the light lens 6 for the main headlamp 3 and for the flashing direction indicator 4 respectively.

What is claimed is:

1. A headlamp-indicator unit for assembly into the body of a motor vehicle, including a reflector unit having defined therein a pair of closed lamp chambers with corresponding reflector walls and openings for lamp sockets for a main headlamp and a flashing direction indicator positioned laterally outwardly from the main headlamp in the vehicle body intermediate the main headlamp in the side of the vehicle body proximate a front corner thereof, the chambers being covered by a corresponding diffusion and light lenses respectively, the headlamp-indicator unit being adjustable through adjustment means interposed between the unit and the body of the motor vehicle, both about a horizontal and about a generally vertical pivot axis, characterized in that the headlamp indicator unit is in part supported by a rounded supporting edge formed as a protrusion on a front fender portion of the vehicle body and a corresponding supporting groove formed on an adjacent portion of the reflector unit which receives the supporting edge in a support plane generally parallel to the longitudinal median plane of the vehicle, the edge in the groove being located on the intersection of the plane and an arc having a center of curvature on the horizontal pivot axis, and in that the light lens of the flashing direction indicator is extended around the front corner of the vehicle body and, as viewed from the side of the motor vehicle body, has a rear edge having an arcuate profile which matches and is concentric with a corresponding receiving recess formed in the adjacent fender portion of the vehicle body.

2. A headlamp-indicator unit according to claim 1 in which the headlamp-indicator unit is provided on its lower edge with supporting ribs abuttingly engagable with horizontal surfaces of an adjacent portion of a vehicle body, which supporting ribs have an arcuate profile defined by a radius having its center on the horizontal pivot axis to maintain the position with respect to the adjacent portion of the vehicle body.

3. A headlamp-indicator unit according to claim 1, wherein means are provided for mounting the unit for pivotal movement about a horizontal pivot axis positioned proximate the vertical median of the unit.

4. A headlamp-indicator unit according to claim 1, in which the engagement of the supporting groove of the reflector unit against the vehicle body portion rounded supporting edge is by a tension spring device, the headlamp-indicator unit having formed thereon a lug positioned on the unit horizontal pivot axis intermediate the lamp chambers and projecting to the rear of the reflector and being attached to one end of the spring device and means being provided on a portion of the vehicle body for attachment to the other end of the spring device.

* * * * *